Jan. 19, 1965     D. G. GENTRY     3,166,047
CLOSURE MEANS FOR POULTRY NESTS
Filed Nov. 21, 1962     2 Sheets-Sheet 1
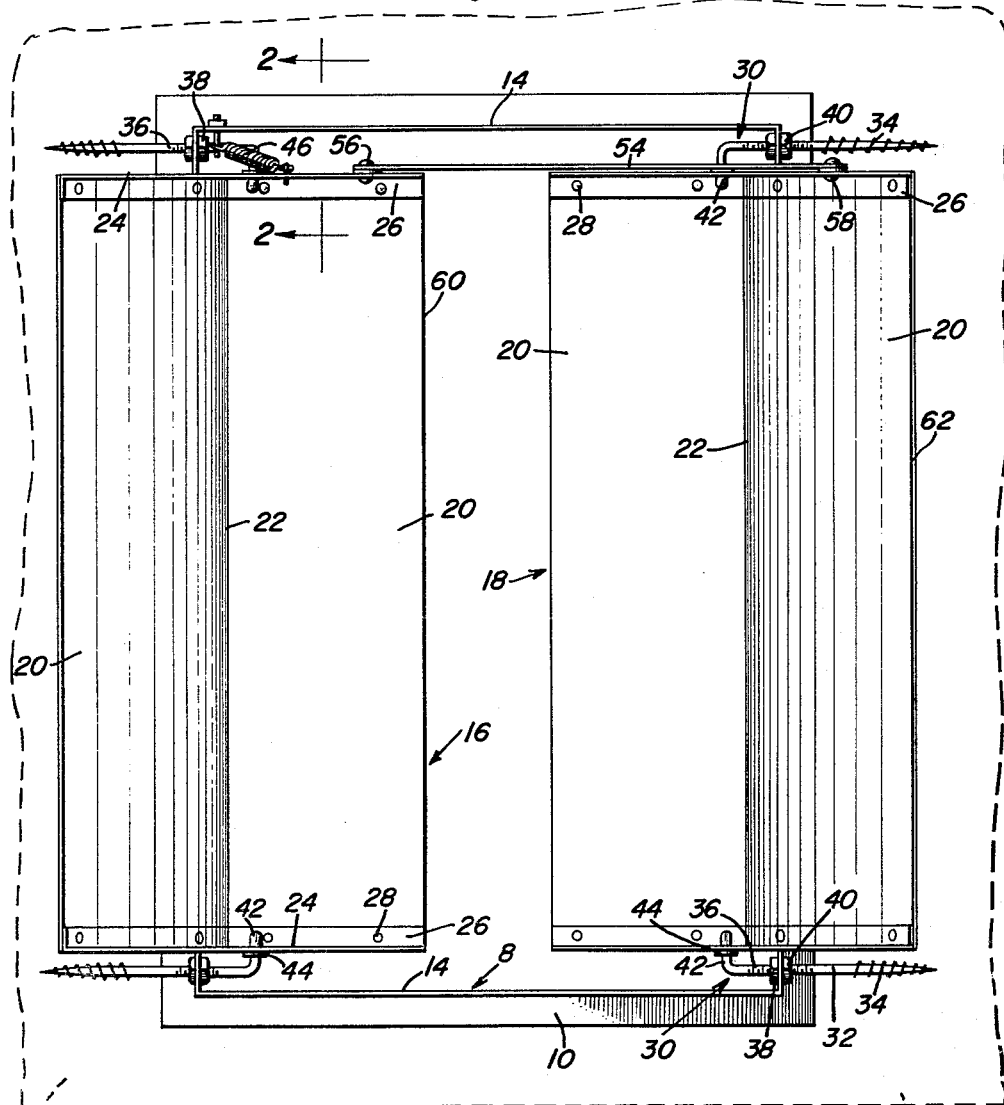
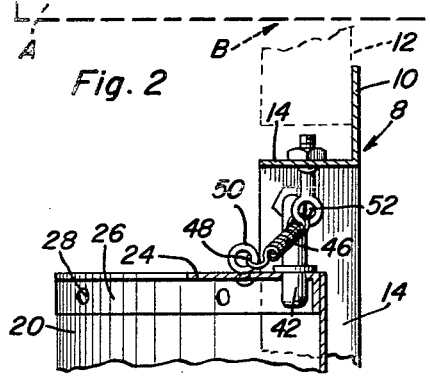
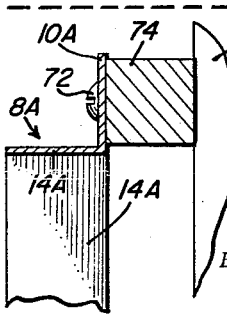
Dwaine G. Gentry
INVENTOR.

Jan. 19, 1965  D. G. GENTRY  3,166,047
CLOSURE MEANS FOR POULTRY NESTS
Filed Nov. 21, 1962  2 Sheets-Sheet 2

Dwaine G. Gentry
INVENTOR.

United States Patent Office 3,166,047
Patented Jan. 19, 1965

3,166,047
CLOSURE MEANS FOR POULTRY NESTS
Dwaine G. Gentry, Manson, Iowa
Filed Nov. 21, 1962, Ser. No. 239,137
4 Claims. (Cl. 119—50)

The present invention relates to improved closure means which is structurally, designed and expressly adapted for ready installation in or across an entrance opening in the vertical front of a hen's nest and has to do, more particularly, with a pair of complemental gates or doors and a mounting and supporting frame therefor and which, in use, provides a semi-type trap nest.

More specifically, the invention pertains to a simple, practical and appropriately constructed dual door or gate structure for a turkey hen's nest. The objective is to restrict the facilities of the nest to the private use of a single hen and to prevent other hens from attempting to crowd in and simultaneously occupy an already occupied nest.

Persons conversant with the art to which the invention relates and the mannerisms of hens are aware that more than one hen will endeavor to occupy a given nest. Such rivalry and the attending mutual annoyance promotes egg breaking, smothering and well known nesting difficulties. Therefore, it is a further objective in the instant endeavor to provide a nest entrance opening with a satisfactory and efficient dual door structure which will prevent a second turkey hen from entering when the nest is about to be or is already in use.

Another object of the invention is to structurally, functionally and in other ways improve upon prior art hen-actuated trap door structures and to, in this manner, provide a feasible and highly practical adaptation which aptly and reliably serves the purposes for which it is intended and which, if desired, can be manually operated to serve as a trap nest.

Briefly summarized the invention is characterized by a door frame which is adapted to be suspended across and in alignment with the entrance opening in the box nest or other enclosure in which the available nest is located. The frame, which can be mounted in a number of ways, is such that it serves to pivotally mount a pair of companion as well as duplicate shutter-like doors. These doors or gates are properly paired and hingedly mounted at upper and lower end portions centrally or intermediate their respective vertical edges. At least one coil spring is provided. This spring is anchored at one end on one door and anchored at its other end on the frame and comes into play when one of the doors is pushed by the incoming hen to a position beyond dead center in a manner to be more fully explained.

The invention features a pair of doors which are adjustably mounted in an adapter frame and have adjacent vertical edges spaced apart. The upper end portions of the two doors are linked together by way of a properly mounted pivotally attached link which causes the doors to open in unison.

Novelty is also predicated on the utilization of properly paired L-shaped hinge brackets or so-called hinge pins which are adjustably mounted on vertical frame members so that it is practical for the user to mount the doors with the space between respective doors variable depending on the size of the nest entrance opening or for other needs and purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in front elevation showing the front wall of a turkey hen's nest and illustrating, more particularly, the invention, namely, the frame and the doors mounted for operation thereon;

FIGURE 2 is an enlarged fragmentary view in section and elevation taken on the vertical section line 2—2 of FIGURE 1 looking in the direction of the arrows;

Figure 3:
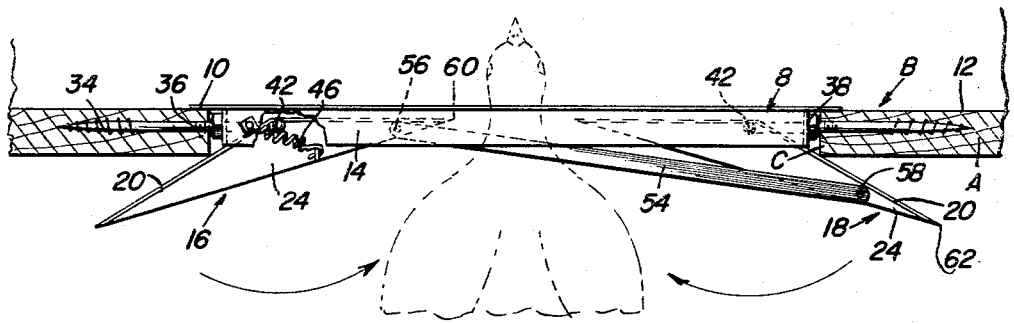
FIGURE 3 is a horizontal section based on FIG. 1 and which shows the doors facing outwardly with the hen about to enter and how, when she comes into contact with the spaced apart edges of the two doors they will be swung around in the direction of the indicating arrows.

Referring first to FIGURES 1 to 5 of the drawings, the front wall A of the nest-containing-box B is provided with an entrance opening C.

The one-piece or equivalent adapter frame is denoted generally by the numeral 8 and it is preferably in the form of an angle iron one flange 10 of which is disposed against the inner surface 12 of the wall A. The other flange 14 projects into the opening C and is such in size that it is spaced from the marginal edge portions of the opening in the manner illustrated. It is desired to employ, as illustrated, two duplicate hen actuated doors, the one at the left (FIG. 1) being denoted by the numeral 16 and the one at the right by the numeral 18. These doors are the same in construction and size and are intended to be so for proper companionate relationship. Each door may be said to be substantially V-shaped in cross-section, the component panels 20 thereof converging and being joined together along the vertical junctional or mid-portion 22. The panels are at approximate obtuse angles in the manner shown. The upper and lower end portions are preferably closed in by substantially triangulate plates 24 having angular attaching flanges 26 matching and secured in place against the cooperating surfaces of the panels as denoted at 28. Substantially L-shaped brackets are employed for hingedly mounting the doors in the associated relationsip required. These brackets are all the same in construction and one bracket only will be described. The bracket is denoted at 30 and comprises a long arm or limb 32 having an inner screw-threaded end 34 which provides a wood screw and screws into the box wall in the manner illustrated. The median portion of the limb or shank passes through an opening provided therefor in the frame flange where it is provided with additional screw-threads at 36 to accommodate inner and outer attaching and adjusting nuts 38 and 40 located on opposite sides of the intervening flange. The upstanding short arm 42 provides a hinge pintle and is provided with a shoulder flange at 44. The respective reinforcing cleats or end plates 24 for the respective gates are provided with suitably located holes through and beyond which the hinge pintles 44 project in the manner illustrated in FIG. 1. Consequently, by locating the hinge brackets in upper and lower paired relation and mounting the same in the manner illustrated the two doors are hingedly suspended for free turning in the doorway defined by the supporting frame 8. It will be further noted that the inner vertical edges of the respective doors 16 and 18 can be moved closer together or farther apart depending on the size of the opening required for the particular job at hand.

It will be noted that a single coil spring 46 is provided and that as shown in FIG. 2 one end is provided with a hook 48 which is engageable with an eye 50 provided therefor on the upper end plate 24 of the cooperating gate 16. An eyebolt 52 is also provided to which the adjacent end of the coil spring is connected. This eyebolt, in turn, is mounted on the coacting flange 14 of the frame in the manner illustrated. The location of the spring and attaching means therefor is such that when the spring is in the position shown in FIG. 3, for example, it is slightly under tension. Then, when the doors move from the position shown in FIG. 3 to the position shown in FIG. 4 the anchor point of the spring is carried around from left to right until it assumes the final position illustrated in FIG. 5 in which position the coil spring is relaxed.

It is obviously desirable that the two doors 16 and 18 must operate at the same turning rate and simultaneously. This is accomplished through the medium of a connecting link 54 which comprises a simple elongated bar having one end 56 hinged to the upper end of the door 16 and the other end 58 hinged to the upper end of the opposite door 18. By utilizing the link in the manner illustrated both doors will be linked together so that they operate in unison, that is, when moved from the normal position illustrated in FIG. 3 to the in-the-nest position illustrated in FIG. 5.

With further reference to the linkage means 54 it is to be noted that the end portion 56 is connected to the leading edge 60 (FIG. 4) while the end portion 58 is connected to the trailing edge 62 of the door 18. This arrangement locates the pivot points 56 and 58 on the required opposite sides of the door hinge points 42 in order to satisfactorily achieve the movement of the doors 16 and 18 from the initial nest-closing position in FIG. 3, the final in-the-nest entrance closing position depicted in FIG. 5 and the intervening stage of operation illustrated in FIG. 4.

Figure 4:
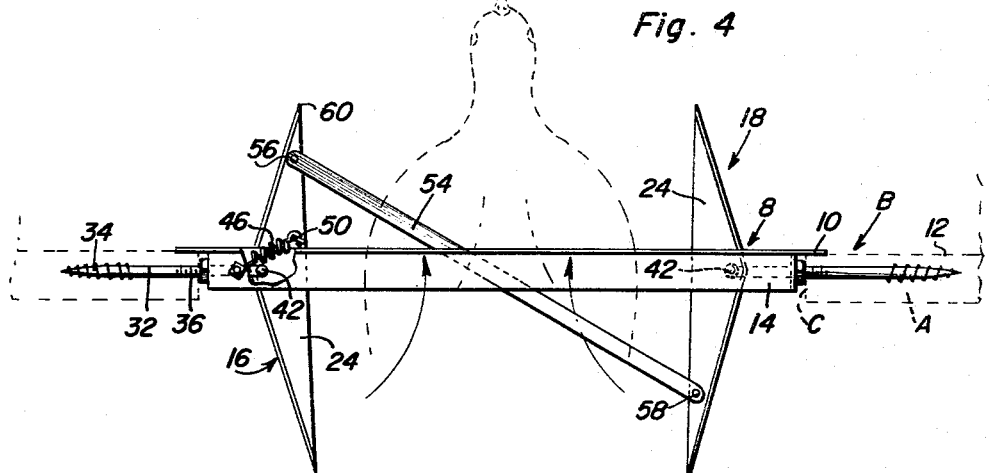
FIGURE 4 is a view which is tied in with FIG. 3 and which shows the intermediate step, that is wherein the doors have swung from their outside toward their inside positions and are momentarily in opposed spaced apart parallelism.
Figure 5:
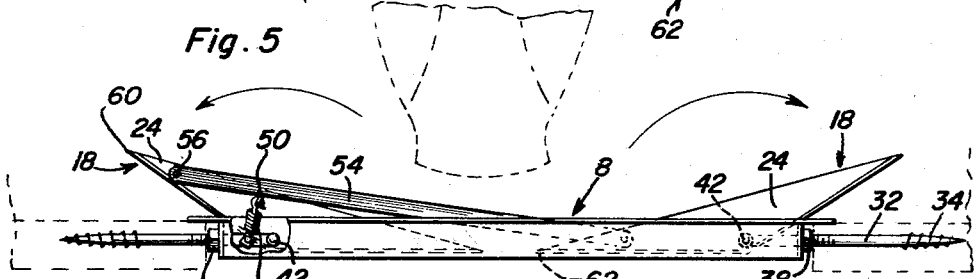
FIGURE 5 is a view showing the final position wherein the hen has entered the nest and the two doors have been pivoted and swung into the confines of the nest so as to afford the user of the nest the desired privacy.

FIGS. 3, 4 and 5 serve to illustrate the several principal positions of the linked gates 16 and 18. FIG. 3 is particular illustrates the turkey hen entering the nest (not detailed) by way of the closable and openable entrance. The dished or hollow sides of the gates 16 and 18 face outwardly in the initial or normal position of the gates. The arrows indicate the movement of the hen and also the simultaneous rotative movement of the two gates when pressure is exerted against either one or both of the gates. Assuming that the hen has exerted pressure against either leading edge both gates will turn inwardly at the same time and will eventually assume the opposed parallel intermediate relationship depicted in FIG. 4. This is the halfway or neutral relationship of the gates at which time the spring 46 takes over and then swings the two gates to the indoor position illustrated in FIG. 5. When the hen wants to come out she merely pushes against the center of the gates and the gates reverse their relationship and are progressively moved from the indoor to the outdoor position illustrated. A nest equipped with the gates allows but one hen at a time in the nest. It reduces egg breakage and other undesirable circumstances.

Figure 6:
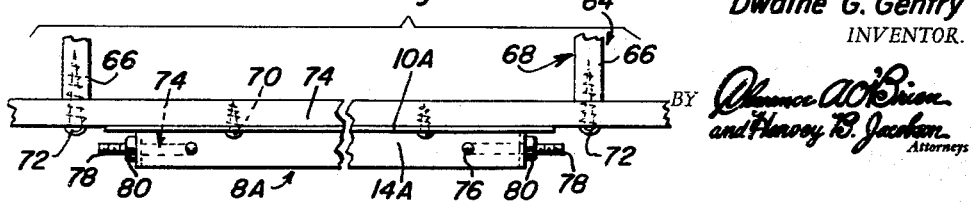
FIGURE 6 is a fragmentary top plan view showing a modification, namely, an alternate way for mounting the door-supporting adapter frame; and, FIGURE 7 is an enlarged fragmentary view in section and elevation based on FIGURE 6.

It is a matter of common knowledge that nests for chickens and turkeys vary in construction and that the instant invention pertains to the nest structure or enclosure having the nest in a broad sense only. This is to say that the present invention is directed to the combination with an open front or equivalent nest regardless of the particular structure which defines the nest. It is of significance that the closure means characterized by the twin openable and closeable doors or gates with the gates mounted on the frame and the frame preferably of the type shown is herein stressed. Consequently, in FIGS. 1 to 5, the frame is shown within the marginal limits of an opening in the front or equivalent wall of the nest structure. It is the purpose of FIGURES 6 and 7 to bring out the fact that the frame carrying the hinged doors may be mounted in other ways. For example, the numeral 64 designates generally the enclosure or equivalent structure having spaced parallel partitions or equivalent vertical walls 66 defining an entrance opening 68. The frame 8A is the same as the already described frame 8 and has marginally encompassing flanges 10A and accompanying or complemental flanges 14A. The flanges 10A are provided with bolt holes 70 to accommodate fastenings 72 which are connected with the partitions or walls 66 on the one hand and are screwed into the horizontal wooden or equivalent support member 74 on the other hand. In actual practice the entrance opening defined by the partitions 66 will be provided with upper and lower support members 74 of appropriate length to which the upper and lower flanges of the frame are screwed, nailed or otherwise fastened. Here the L-shaped door hangers 74 (FIG. 6) have vertical members 76 providing end pintles and horizontal arm portions which pass through openings provided therefor in the frame flange and which are screw threaded as at 78 to accommodate the assembling and adjusting nuts 80. The doors are not shown in these two added figures for the reasons that the purpose of these figures is to emphasize the fact that the angle iron frame 8A is capable of spanning the entrance to the nest and can be adjusted to comply with the changing needs of varying nest sizes. The fact that the adapter frames with hingedly mounted paired doors may, of course, be made in various over-all sizes is to be mentioned here. However, it is believed that a few given sizes can be adapted and adjustments, such as are required in respect to the nest entrances can be taken care of by the provision of means for adjustably mounting the door frames and the present disclosure is to be interpreted accordingly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, an enclosure having a nest for a turkey hen and embodying a front wall provided with an entrance-exit opening aligned with said nest and adapted to permit the hen to enter and leave the nest at will, a frame mounted on said front wall and having an opening aligned with said entrance-exit opening, said frame being mounted in a vertical plane and having cooperating horizontal and vertical frame members, closure means for the frame's opening embodying a pair of hen-actuated gate-like doors having upper and lower median portions hingedly bracketed on associatively cooperable upper and lower corner portions of said frame, a single coil spring having one end anchored on a component member of the frame and the other end anchored on a generally central part of an upper end portion of a cooperating one of said doors adjacent but beyond the upper hinge point of said one door, and a single door connecting and operating link having one end portion pivotally connected to an upper end portion of said one door adjacent said upper hinge point and proximal to the vertical inner leading edge of said one door, said link spanning the existing space between the inner adjacent vertical edges of both doors and having its other end pivotally connected to the upper end of the other door outwardly beyond the upper hinge point thereof but inwardly of its outer vertical trailing edge, said link functioning to cause simultaneous operation of the two doors while they are being swung from an outdoors position outwardly of said frame to an indoors position inwardly of said frame.

2. In combination, an enclosure having a nest for a turkey hen, said enclosure having a front wall provided with an opening aligned with the nest and adapted to permit the hen to enter and leave the nest at will, a frame mounted on said front wall and aligned with said opening, said frame being mounted on said wall in a vertical plane, closure means for the frame's opening embodying a pair of hen-actuated gate-like doors having median portions of their upper end lower end portions hingedly bracketed on associatively cooperable upper and lower corner portions of said frame, a single coil spring having one end anchored on a component member of the frame, and the other end anchored on an end portion of a cooperating one of said doors adjacent but beyond the upper hinge point of said one door, said doors being V-shaped in transverse section and comprising two angularly related sections and comprising a first section of a length greater than the second section, and an operating link pivotally mounted intermediate the door pivots and the end of the door connecting said first sections of one door to a second section of the other door.

3. A hen actuated door structure for use in conjunction with an entrance-exit opening in a vertical wall of a hen's nest comprising a frame embodying horizontal top and bottom frame members connected by complemental vertical frame members, said frame constituting a door mounting adapter and being adapted to be mounted across said entrance-exit opening in cooperative alignment therewith, a first gate-like door having upper and lower mounting and hinging brackets operatively connected to the respectively cooperating upper and lower ends of said door, said brackets being adjustably mounted in associatively cooperable upper and lower corner portions of one half-portion of said frame, a second door complemental to and cooperable with said first door and positioned at a side of said frame opposite the side in which said first door is mounted, the upper and lower end portions of said second door being provided with hinging and mounting brackets and said brackets being detachably and adjustably mounted in the adjacent upper and lower corner portions of the other half-portion of said frame, said doors having inwardly disposed vertical marginal edge portions spaced apart, said doors being V-shaped in transverse cross-section and having horizontal upper and lower end plate closing their respective upper ends, a single operating link having one end portion residing atop the upper end plate of said first door and pivotally connected to said upper end plate at a point proximal to the inner vertical edge of said first door, the median portion of said link bridging the space between the vertical inner edges of both of said doors, and the other end portion of said link residing atop the upper end plate of said second door and having its terminal portion located outwardly of as well as beyond the hinge point of said second door and pivotally connected to said last-named upper end plate just inwardly of the outer vertical edge of said second loor.

4. For use in automatically entrapping a fowl and excluding other fowls during the period of occupancy of an enclosed nest and wherein said enclosure has a wall with an opening therein leading to the nest; a frame, said frame being made up of top and bottom angle irons connected at their respective ends by complemental vertical angle irons, said frame constituting an adapter for closure means and being adapted to be mounted in alignment with the entrance-exit opening cooperable with the aforementioned nest, upper and lower brackets adjustably mounted in upper and lower corner portions of said frame at one side of the frame and projecting into the perimeter limits of the frame and having axially aligned hinging journals, a first gate-like door having upper and lower horizontal end plates, said end plates being hingedly mounted on journals provided therefor on said upper and lower brackets, a coil spring having an upper end anchored on said frame adjacent a cooperating one of said brackets, the lower end of said coil spring being anchored on said upper end plate proximal to but projecting inwardly beyond the cooperating hinging journal, a second pair of upper and lower brackets adjustably mounted at upper and lower ends of the vertical angle iron opposite to the first-named vertical angle iron and within the vicinity of the upper and lower corner portions of the frame and having inwardly projecting axial hinging journals, and a second gate-like door similar to said first gate like door and having upper and lower end plates, said end plates having median portions thereof hingedly mounted on the upper and lower hinging journals, the inner edges of said gates being spaced apart but susceptible of being bodily adjusted toward and from each other to regulate and fix the space between said inner edges, and a single link having a median portion spanning the space between the inner vertical edges of the respective doors and having one end pivotally anchored on the upper end plate of said first door at a point adjacent to the inner vertical edge of said first door, having its upper end portion residing atop the upper end plate of the second door and projecting beyond the hinging point and being hingedly joined to said last-named end plate adjacent to but inwardly of the normal outer vertical edge of said second door.

References Cited in the file of this patent

UNITED STATES PATENTS

| | | |
|---|---|---|
| 69,392 | Blackman | Oct. 1, 1867 |
| 809,528 | Reid | Jan. 9, 1906 |
| 3,045,645 | Fisher | July 24, 1962 |